UNITED STATES PATENT OFFICE.

GEORGE O. MORSE, OF DES MOINES, IOWA.

RUBBER COMPOSITION.

1,262,828. Specification of Letters Patent. Patented Apr. 16, 1918.

No Drawing. Application filed October 30, 1915, Serial No. 58,781. Renewed February 25, 1918. Serial No. 219,114.

*To all whom it may concern:*

Be it known that I, GEORGE O. MORSE, a citizen of the United States, residing at Des Moines, in the county of Polk and State of Iowa, have invented certain new and useful Improvements in Rubber Compositions, of which the following is a specification.

My invention relates to an improved composition of materials forming what may be termed a rubber composition or substitute, the object being the provision of a composition of this nature or character which will provide a perfect substitute for rubber, particularly in its uses for automobile tires, door mats, stair pads, floor coverings, weather strips, packings, washers, and in fact generally for service in most situations where rubber would be desirable and useful.

Another object of my invention is the provision of a composition of the character and for the purposes stated which will possess the elasticity or resiliency of rubber, but which can be manufactured at a much lower cost and prove more durable and lasting as well as more efficient than the pure rubber product, thus insuring a practical and desirable article for the purposes intended.

With these objects in view, the invention consists of a composition composed of ordinary cotton material, powdered asbestos, crude pure rubber, gum acacia, gum tragacanth, and oil of eucalyptus, compounded in the manner and proportions hereinafter stated.

In producing a batch or desired quantity of the material, I use 20 parts ordinary cotton ground or cut into small pieces; 20 parts asbestos; 60 per cent. of crude pure rubber; 10 parts gum acacia; 10 parts gum tragacanth; and 10 parts oil of eucalyptus. This composition of materials is placed in large cylinders, such as are used for preparing rubber for automobile tires and subjected to heat and thoroughly mixed to cause the cotton, asbestos, rubber, gum acacia, gum tragacanth and oil of eucalyptus to commingle and form a mass or batch. This mass or batch, after being treated in the manner stated is rolled into sheets of the necessary and desired thickness to form tires, mats, floor coverings or any other articles for which it would prove serviceable.

It will be understood that the composition provides a material which will be highly efficient either in making the complete tire or the outer covering for the tire, and that such a composition can be produced at about one-half the cost of the usual rubber tires, but will last many times longer than the rubber tire, and further that the elasticity is retained, the material will resist puncture much better than the rubber, will not become highly heated in the same manner as rubber, and generally from every point of view, will prove a more desirable article than the pure rubber product.

I have found from experience that the proportion stated gives excellent results, but would have it understood that the proportion may be changed if found necessary and desirable, without departing from the scope of my invention.

It will also be understood that the composition can be used for practically all purposes where rubber is now doing service, and will prove a more efficient, desirable and practical article than rubber.

I claim:—

The herein described composition for the purpose described, comprising cotton, powdered asbestos, crude rubber, gum acacia, gum tragacanth, and oil of eucalyptus, compounded in the manner and proportions stated.

In testimony whereof I affix my signature in presence of two witnesses.

GEORGE O. MORSE.

Witnesses:
H. V. SPEER,
MARY A. STAHL.